US008407479B2

(12) United States Patent
Driscoll

(10) Patent No.: US 8,407,479 B2
(45) Date of Patent: Mar. 26, 2013

(54) DATA AUTHENTICATION AND TAMPER DETECTION

(75) Inventor: Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 2492 days.

(21) Appl. No.: 10/750,529

(22) Filed: Dec. 31, 2003

(65) Prior Publication Data

US 2005/0149737 A1 Jul. 7, 2005

(51) Int. Cl.
*G06F 21/00* (2006.01)
*H04L 9/32* (2006.01)
(52) U.S. Cl. .......... 713/182; 713/176; 713/170
(58) Field of Classification Search .......... None
See application file for complete search history.

(56) References Cited

U.S. PATENT DOCUMENTS

| 6,144,739 | A | 11/2000 | Witt et al. | |
|---|---|---|---|---|
| 6,910,130 | B2 * | 6/2005 | Imai et al. | 713/180 |
| 6,986,054 | B2 * | 1/2006 | Kaminaga et al. | 713/193 |
| 8,219,819 | B2 * | 7/2012 | Little | 713/176 |
| 2002/0080974 | A1 * | 6/2002 | Grawrock | 380/282 |
| 2003/0033545 | A1 * | 2/2003 | Wenisch et al. | 713/202 |
| 2010/0174910 | A1 * | 7/2010 | Little | 713/176 |

FOREIGN PATENT DOCUMENTS

| WO | WO-00/18162 A1 | 3/2000 |
|---|---|---|
| WO | WO 0018162 * | 3/2000 |
| WO | WO-01/84768 A1 | 11/2001 |
| WO | WO-02/17048 A2 | 2/2002 |

OTHER PUBLICATIONS

Public Key encryption and digital signature: How do they work? Entire contents 2004 by CGI Group Inc.*
"International Search Report for corresponding PCT Application No. PCT/US2004/042800", (Mar. 9, 2005), 7 pgs.
Menezes, A. J., et al., *Handbook of Applied Cryptography*, CRC Press, Inc., Boca Raton, FL, (1997), 397-405.
Menezes, A. J., et al., "Chapter 9—Hash Functions and Data Integrity", In: *Handbook of Applied Cryptography*, CRC Press, Boca Raton, FL,(1997), 321-383.
Schneier, B., *Applied Cryptography, Protocols, Algorithms, and Source Code in C*, John Wiley & Sons, New York, NY, (1996), 455-459.
Schneier, B. , "Merkle's Puzzles", In: *Applied Cryptography, Protocols, Algorithms, and Source Code in C*, John Wiley & Sons, New York, NY, (1996), 34-44.
Schneier, B. , "Applied Cryptography", *Applied Cryptography,Protocols, Algorithms, and Source Code in C*, (1996),455-459.

* cited by examiner

*Primary Examiner* — Fikremariam A Yalew
(74) *Attorney, Agent, or Firm* — Schwegman, Lundberg & Woessner, P.A.

(57) ABSTRACT

One embodiment includes a method that includes receiving an ephemeral value from a challenging device. The method also includes retrieving data whose content is presumed known to the challenging device. The method includes generating a digital signature of the data based on the ephemeral value. Additionally, the method includes transmitting the digital signature to the challenging device.

31 Claims, 6 Drawing Sheets

DATA AUTHENTICATION AND TAMPER DETECTION

TECHNICAL FIELD

The application relates generally to data processing, more particularly, to data authentication and tamper detection.

BACKGROUND

Authentication of applications executing in different types of devices and products is becoming increasingly important. In particular, it is becoming important to determine whether application code within a product has not been modified from its as-delivered form. Such modification may include accidental or deliberate tampering or through the aegis of a computer security breach. (such as computer viruses, worms, etc.).

SUMMARY

Methods, apparatuses and systems for data authentication and tamper detection are described. An embodiment of the invention authenticates that an operational part of application code has not been modified from its as-delivered form. In one embodiment, an ephemeral value that is unpredictable is used to authenticate data that is of known content. While described with reference to authentication of application code, embodiments of the invention may authenticate other types of data. In an embodiment, such data may include externally predictable values, such as encryption keys, configuration parameters, etc. that are known to both the challenging device and the device storing data whose contents are being authenticated. As further described below, embodiments of the invention may authenticate data in an entire address space or parts thereof.

An embodiment of the invention authenticates that an operational part of application code has not been modified from its as-delivered form. As will be described, embodiments of the invention allow for authentication of application code that is within a device that is manufactured by a potential adversary country or company. In particular, embodiments of the invention validate that application code placed in such devices is unchanged from that which was originally placed therein.

Additionally, embodiments of the invention can be used to validate that a "black box" part of a run-time image that is included in multiple releases of software remains unchanged. Specifically, embodiments of the invention can authenticate that the "black box" part of the application code that is currently operating in a device is unchanged from that which was originally or previously placed into the device. Accordingly, this reduces the amount of effort required to recertify/revalidate an unchanged part of this run-time image when one or more other parts of such image are changed due to normal software maintenance and upgrade processes.

One embodiment includes a method that includes receiving an ephemeral value from a device. The method also includes retrieving data whose content is known to the device. The method includes generating a digital signature of the data based on the ephemeral value. Additionally, the method includes transmitting the digital signature to the device.

In an embodiment, a method includes authenticating data having predictable content and stored in an address space of a remote device. The authentication includes generating a random number. The authentication also includes transmitting the random number to a device having the data. Additionally, the authentication includes receiving a first digital signature that is representative of the data. The authentication includes generating a second digital signature based on the random number. Further, the authentication includes comparing the first digital signature to the second digital signature.

In one embodiment, an apparatus comprises a storage medium to store data. The apparatus also includes an input/output (I/O) logic to receive a request for authentication, wherein the request includes an ephemeral value. The apparatus includes a signature logic to retrieve at least part of the data from the storage medium. The signature logic is to generate a cryptographic hash across the at least part of the data based on the ephemeral value.

In an embodiment, a challenge device is to authenticate data to be stored in a response device. The challenge device includes a storage medium to store a copy of the data. The challenge device includes a key generation logic to generate an ephemeral value. The challenge device also includes an I/O logic to output a request for authentication to a response device, wherein the request includes the ephemeral value. The I/O logic is to receive a first digital signature from the response device in response to the request for authentication. Additionally, the challenge device includes a signature logic to retrieve the copy of the data and the ephemeral value. The signature logic is to generate a second digital signature. The challenge device includes an authentication logic to compare the first digital signature to the second digital signature, wherein the data is authenticated if the first digital signature equals the second digital signature.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for data authentication and tamper detection are described. In the following description, numerous specific details are set forth. However, it is understood that embodiments of the invention may be practiced without these specific details. In other instances, well-known circuits, structures and techniques have not been shown in detail in order not to obscure the understanding of this description.

This detailed description is divided into three sections. In the first section, a system overview is presented. In the second section, authentication operations are described. In the third section, a hardware and operating environment is described.

System Overview

In this section, a system overview is presented. The system overview presents a network configuration used in conjunction with embodiments of the invention. The system overview also presents the general functionality of the network configuration.

Figure 1:
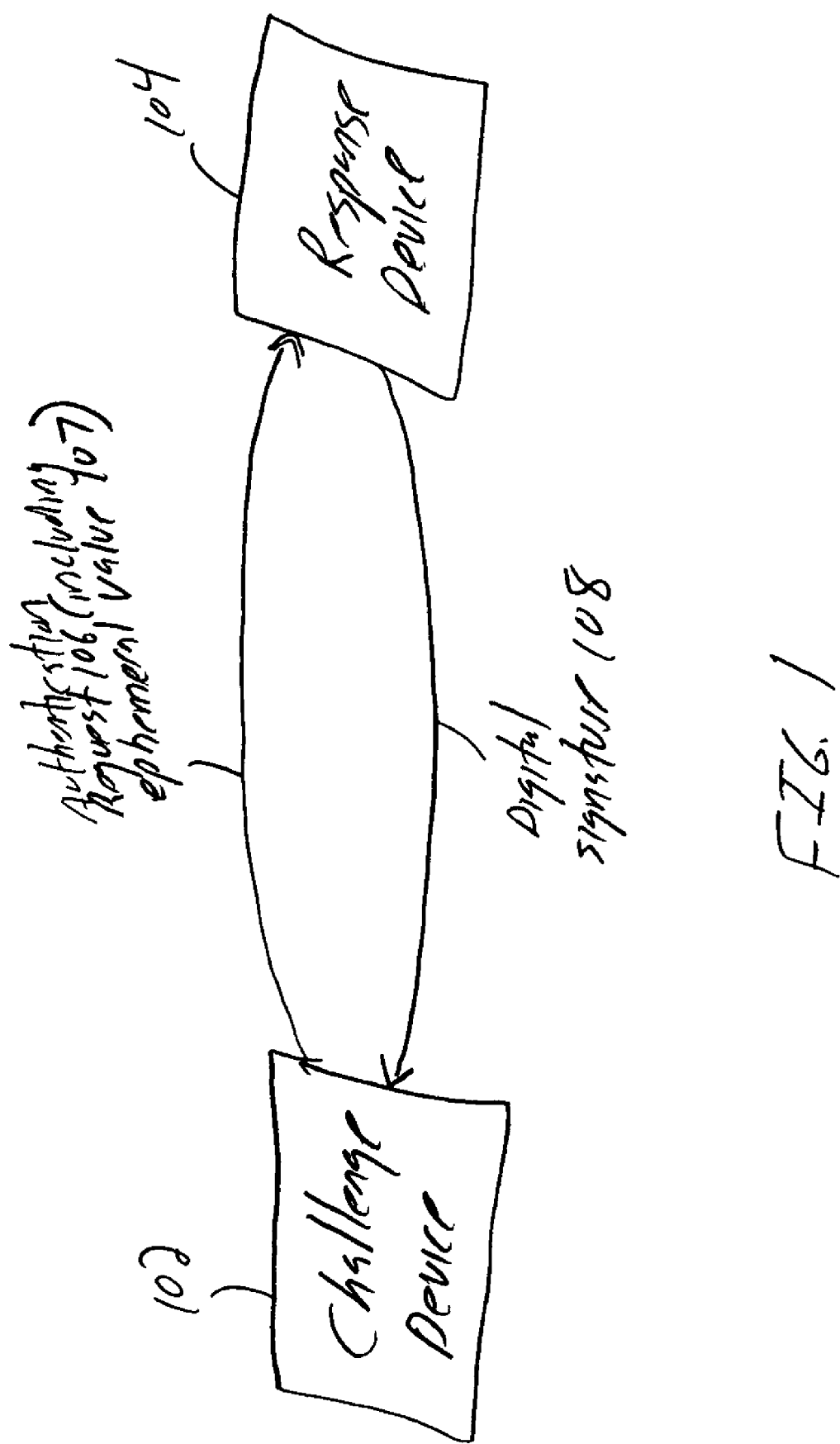
FIG. 1 illustrates a simplified block diagram of a system for data authentication and tamper detection, according to one embodiment of the invention.

FIG. 1 illustrates a simplified block diagram of a system for data authentication and tamper detection, according to one embodiment of the invention. In particular, FIG. 1 illustrates a system 100 that includes a challenge device 102 and a response device 104. As shown, the challenge device 102 transmits an authentication request 106 (which includes an ephemeral value 107) to the response device 104. In response, the response device 104 transmits a digital signature (e.g., a cryptographic hash) 108 back to the challenge device 102. As described in more detail below, the authentication request 106 is to authenticate data (stored on the response device 104). Such data may be of any type that is known to the challenge device 102 and should be known to the response device 104. Examples of such data may be an executable of an application (such as an operating system executing on the response device 104), encryption keys used by applications executing on the response device 104, configuration parameters for the response device 104, etc.

The ephemeral value 107 may be a number of different values, which are considered unpredictable relative to an adversary who may attempt to compromise the response device 104. In one embodiment, the ephemeral value 107 may be generated by the challenge device 102. In an embodiment, the ephemeral value 107 may be generated by a different device (not shown). Accordingly, this different device may provide the ephemeral value 107 (e.g., within in a file of one or more of such values) to the challenge device 102. In one embodiment, the ephemeral value 107 is generated based on random number generation. The response device 104 receives the authentication request 106 and generates a digital signature or a hash value across the known data using the ephemeral value as a key for such operation. For example, the response device 104 generates a cryptographic hash across the known data, wherein the ephemeral value 107 is used as the key for this cryptographic hash operation.

Accordingly, embodiments of the invention incorporate an unpredictable value (the ephemeral value 107) into an authentication operation of data that is of a presumed known content. Such embodiments may be used to authenticate that an operational section of code is unchanged from its as-delivered form. While described with reference to a given authentication based on a single challenge/response, embodiments of the invention are not so limited. For example, in one embodiment, multiple challenges/responses may be performed across multiple sections of data of known content.

Hardware and Operating Environment

This section provides an overview of the exemplary hardware and the operating environment in which embodiments of the invention can be practiced.

Figure 2:
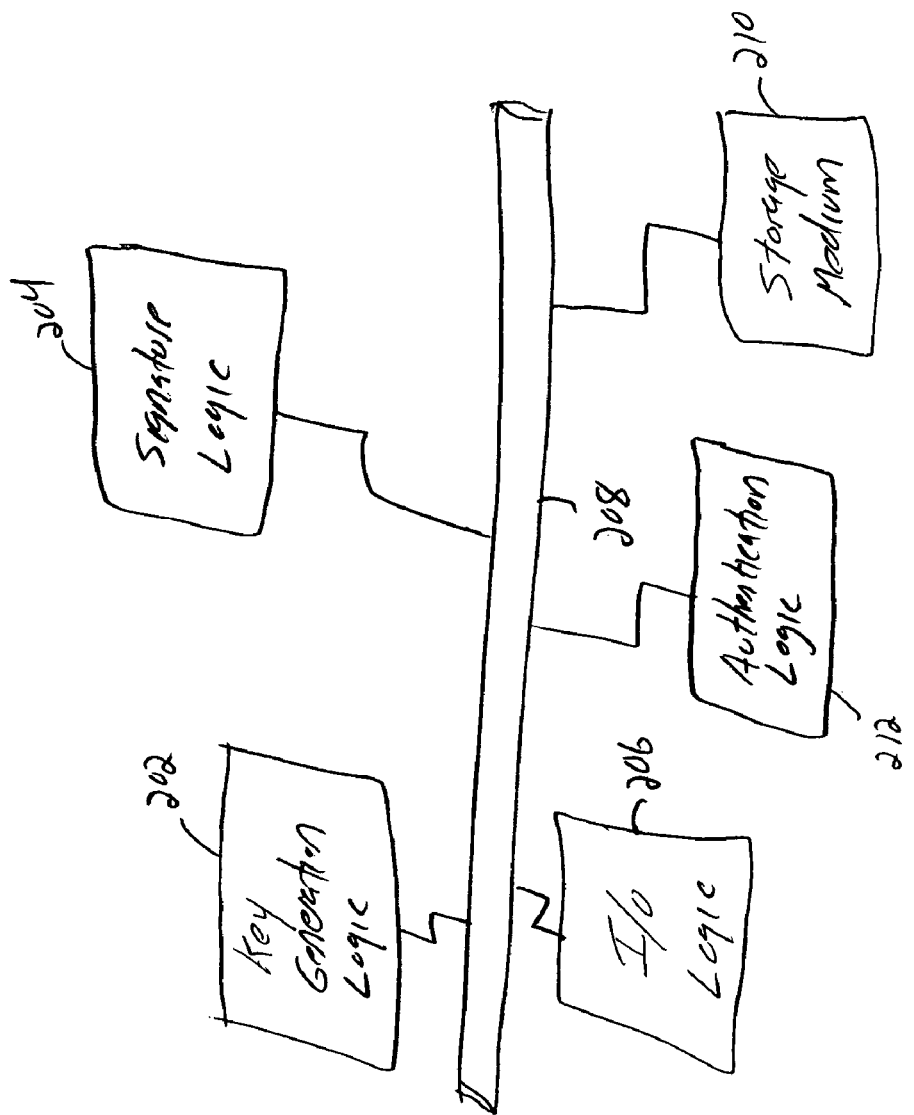
FIG. 2 illustrates a simplified block diagram of a challenge device, according to one embodiment of the invention.

FIG. 2 illustrates a simplified block diagram of a challenge device, according to one embodiment of the invention. In particular, FIG. 2 illustrates a more detailed block diagram of the challenge device 102, according to one embodiment of the invention. As shown, the challenge device 102 may include a key generation logic 202, a signature logic 204, an input/output (I/O) logic 206, an authentication logic 212 and a storage medium 210, which are coupled together through a bus 208.

The storage medium 210 may be representative of nonvolatile memory, volatile memory or a combination thereof. For example, the storage medium 210 may be a secondary storage, such as a hard disk drive. The storage medium 210 may also be a flash memory. In an embodiment, the storage medium 210 can be different types of random access memory (RAM). For example, the storage medium 210 can be a Static RAM (SRAM), a Synchronous Dynamic RAM (SDRAM), a DRAM, a double data rate (DDR) Synchronous Dynamic RAM (SDRAM), etc. In one embodiment, the storage medium 210 stores a copy of the data (that is of a known content) that is presumed stored on the response device 104, which is to be authenticated, in accordance with embodiments of the invention.

The key generation logic 202, the signature logic 204, the I/O logic 206 and the authentication logic 212 may be hardware, software or a combination thereof. One embodiment of a system wherein the key generation logic 202, the signature logic 204, the I/O logic 206 and the authentication logic 212 are software is described in more detail below in conjunction with the description of a computer system 400 of FIG. 4. While illustrated as different logic blocks, in an embodiment, the operations performed by such logic blocks may be performed by one or more of such blocks. An embodiment of operations of the key generation logic 202, the signature logic 204, the I/O logic 206 and the authentication logic 212 are described in more detail below in conjunction with the description of a flow diagram 500 of FIG. 5.

Figure 3:
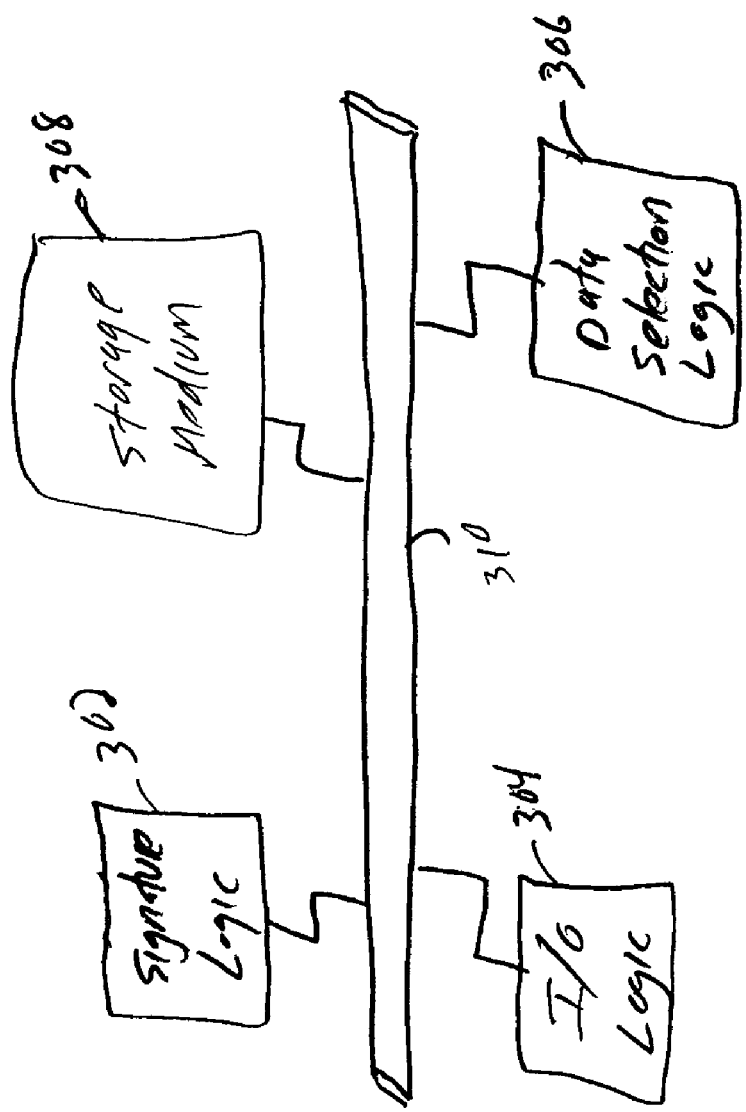
FIG. 3 illustrates a simplified block diagram of a response device, according to one embodiment of the invention.

FIG. 3 illustrates a simplified block diagram of a response device, according to one embodiment of the invention. In particular, FIG. 3 illustrates a more detailed block diagram of the response device 104, according to one embodiment of the invention. As shown, the response device 104 may include a signature logic 302, an input/output (I/O) logic 304, a data selection logic 306 and a storage medium 308, which are coupled together through a bus 310.

The storage medium 308 may be representative of nonvolatile memory, volatile memory or a combination thereof. For example, the storage medium 308 may be a secondary storage, such as a hard disk drive. The storage medium 308 may also be a flash memory. In an embodiment, the storage medium 308 can be different types of random access memory (RAM). For example, the storage medium 308 can be a Static RAM (SRAM), a Synchronous Dynamic RAM (SDRAM), a DRAM, a double data rate (DDR) Synchronous Dynamic RAM (SDRAM), etc. In one embodiment, the storage medium 308 stores the data (that is of a presumed known content), which is to be authenticated, in accordance with embodiments of the invention.

The signature logic 302, the I/O logic 304 and the data selection logic 306 may be hardware, software or a combination thereof. One embodiment of a system wherein the signature logic 302, the I/O logic 304 and the data selection logic 306 are software is described in more detail below in conjunction with the description of a computer system 400 of FIG. 4. While illustrated as different logic blocks, in an embodiment, the operations performed by such logic blocks may be performed by one or more of such blocks. An embodiment of operations of the signature logic 302, the I/O logic 304 and the data selection logic 306 are described in more detail below in conjunction with the description of a flow diagram 600 of FIG. 6.

Figure 4:
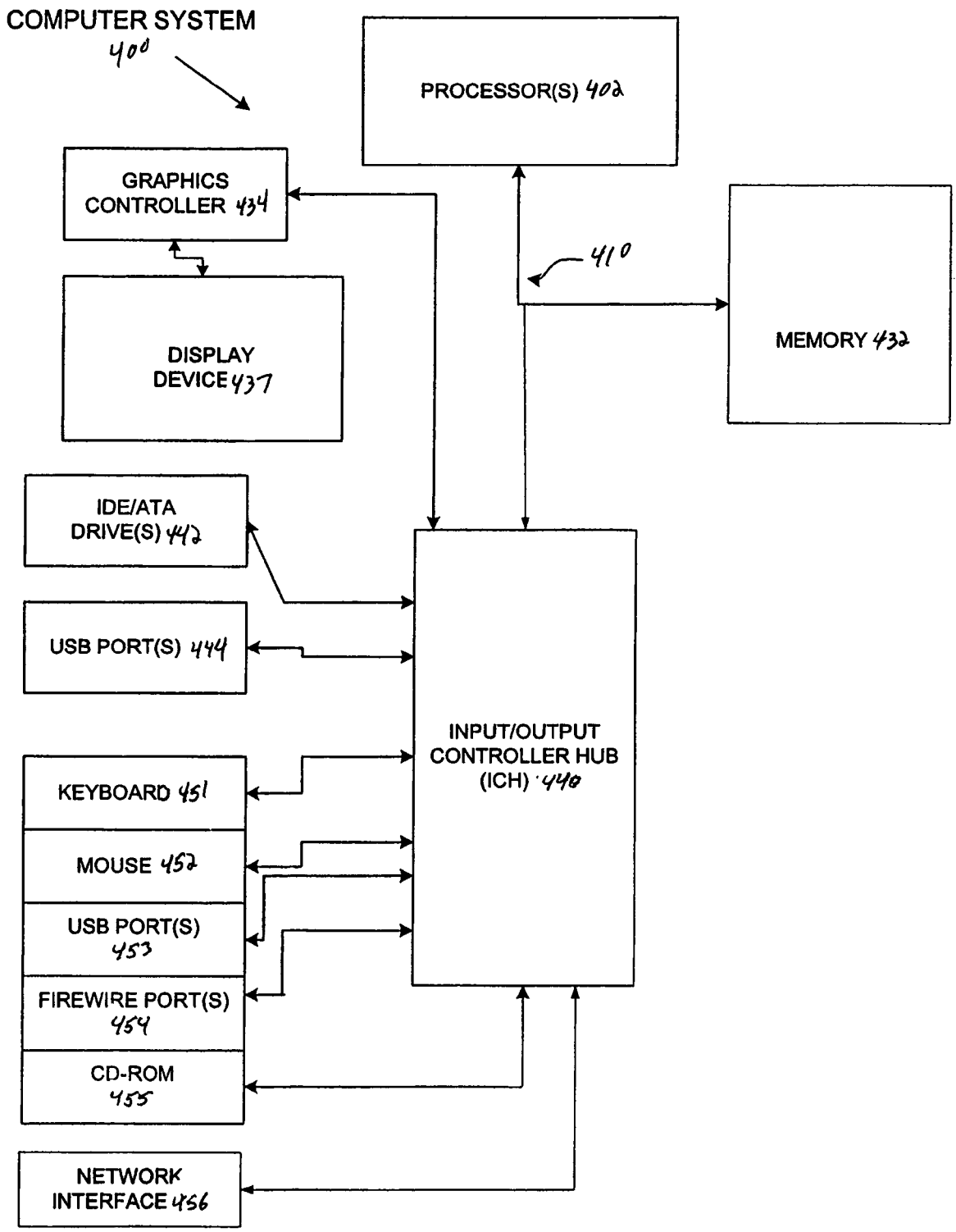
FIG. 4 illustrates a simplified block diagram of a challenge device or a response device, according to another embodiment of the invention.

FIG. 4 illustrates a simplified block diagram of a challenge device or a response device, according to another embodiment of the invention. As illustrated in FIG. 4, a computer system 400 comprises processor(s) 402, a memory 432, a processor bus 410 and an input/output controller hub (ICH) 440. The processor(s) 402, the memory 432 and the ICH 440 are coupled to the processor bus 410. The processor(s) 402 may comprise any suitable processor architecture. For other embodiments of the invention, the computer system 400 may comprise one, two, three, or more processors, any of which may execute a set of instructions that are in accordance with embodiments of the present invention.

The memory 432 stores data and/or instructions, and may comprise any suitable memory, such as different types of random access memory (RAM). For example, the storage medium 308 can be a Static RAM (SRAM), a Synchronous Dynamic RAM (SDRAM), DRAM, a double data rate (DDR) Synchronous Dynamic RAM (SDRAM), etc. The computer system 400 also includes IDE/ATA drive(s) 442 and/or other suitable storage devices. A graphics controller 434 controls the display of information on a display device 437, according to embodiments of the invention.

The input/output controller hub (ICH) 440 provides an interface to I/O devices or peripheral components for the computer system 400. The ICH 440 may comprise any suitable interface controller to provide for any suitable communication link to the processor(s) 402, memory 432 and/or to any suitable device or component in communication with the ICH 440. For one embodiment of the invention, the ICH 440 provides suitable arbitration and buffering for each interface.

For one embodiment of the invention, the ICH 440 provides an interface to one or more suitable integrated drive electronics (IDE/ATA) drives 442, such as a hard disk drive (HDD), a compact disc read only memory (CD ROM) drive, or to suitable universal serial bus (USB) devices through one or more USB ports 444 (e.g., a flash memory drive). For one embodiment, the ICH 440 also provides an interface to a keyboard 451, a mouse 452, one or more suitable devices through one or more USB ports 453 (e.g., a printer), and one or more suitable devices through one or more Firewire ports 454. For one embodiment of the invention, the ICH 440 also provides a network interface 456 though which the computer system 400 can communicate with other computers and/or devices.

In one embodiment, the computer system 400 includes a machine-readable medium that stores a set of instructions (e.g., software) embodying any one, or all, of the methodologies described herein. Furthermore, software can reside, completely or at least partially, within the memory 432.

Returning to FIGS. 2 and 3 to help illustrate, one or more such logic blocks shown therein (the key generation logic 202, the signature logic 204, the I/O logic 206, the authentication logic 212, the signature logic 302, the I/O logic 304 and the data selection logic 306) may be representative of software that are machine-readable instructions stored completely or at least partially in one of the IDE/ATA drives 442 and/or the memory 432. Moreover, such machine-readable instructions may be executed within the processor(s) 402. Additionally, the storage medium 210 and the storage medium 308 may be one or a combination of the IDE/ATA drive 442, a flash memory drive coupled to the USB port(s) 444 or the memory 432.

Data Authentication and Tamper Detection Operations

Figure 5:
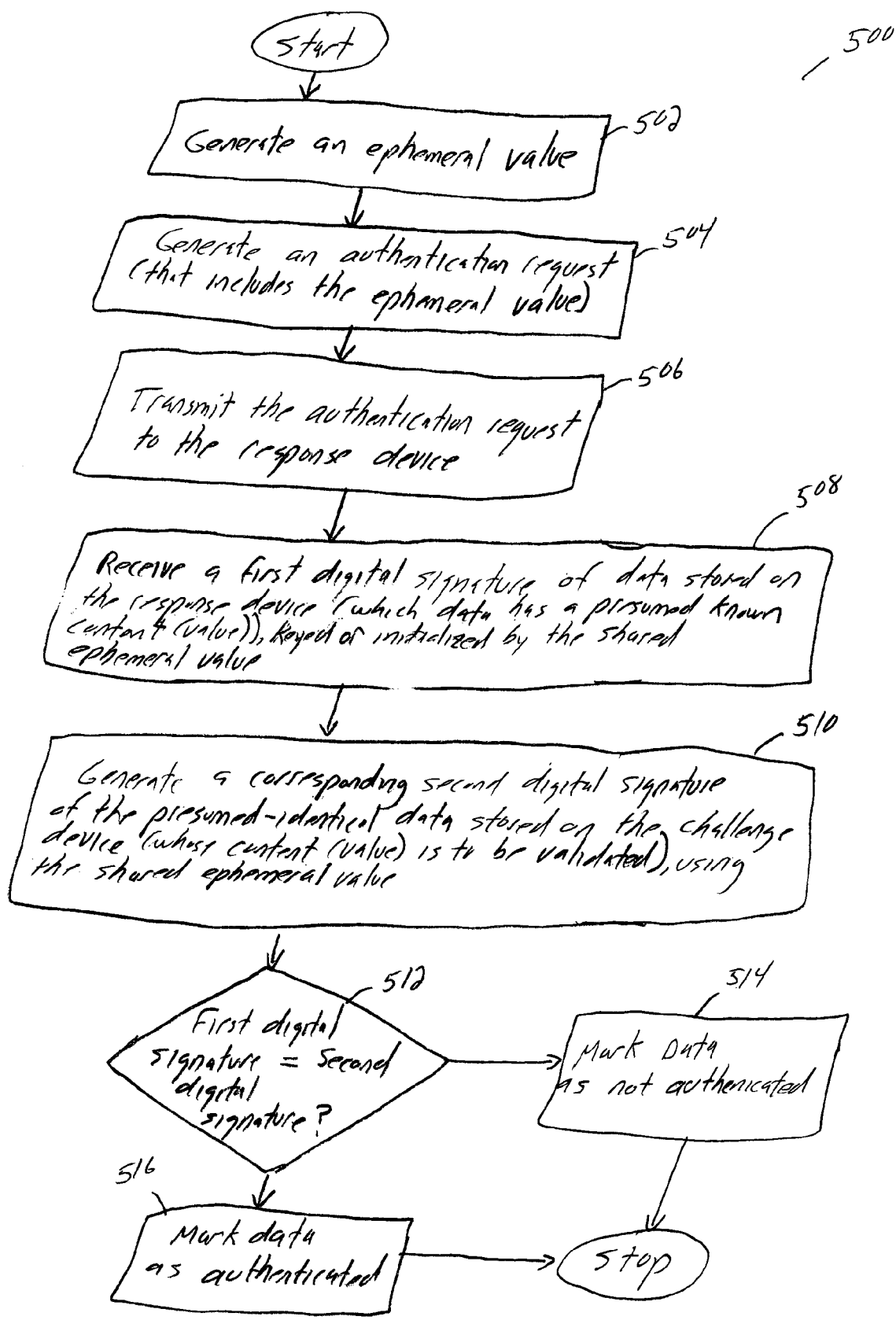
FIG. 5 illustrates a flow diagram for authenticating data on a remote device, according to one embodiment of the invention.

This section provides a description of data authentication and tamper detection operations, according to one embodiment of the invention. FIG. 5 illustrates a flow diagram for authenticating data on a remote device, according to one embodiment of the invention. In particular, FIG. 5 illustrates a flow diagram 500 for the operations within a challenge device, according to one embodiment of the invention.

In block 502, an ephemeral value is generated. With reference to the embodiments of FIGS. 1 and 2, the key generation logic 202 generates the ephemeral value 107. As described above, the ephemeral value 107 may be a number of different values, which are considered unpredictable relative to an adversary who may attempt to compromise the response device 104. In one embodiment, the key generation logic 202 generates the ephemeral value 107 based on random number generation. While the ephemeral value 107 may be of different sizes, in an embodiment, the size of the ephemeral value 107 may be 128 bits, 192 bits, 224 bits, 256 bits, etc. Control continues at block 504.

In block 504, an authentication request (that includes the ephemeral value) is generated. With reference to the embodiments of FIGS. 1 and 2, the authentication logic 212 receives the ephemeral value 107 and generates the authentication request 106. Control continues at block 506.

In block 506, the authentication request (that includes the ephemeral value) is transmitted to a response device. With reference to the embodiments of FIGS. 1 and 2, the I/O logic 206 transmits the authentication request 106 (that includes the ephemeral value 107) to the response device 104. Control continues at block 508.

In block 508, a first digital signature of data stored on the response device (which data has a presumed known content (value)), keyed or initialized by the shared ephemeral value is received. With reference to the embodiments of FIGS. 1 and 2, the I/O logic 206 receives the first digital signature 108. Control continues at block 510.

In block 510, a corresponding second digital signature of the presumed-identical data stored on the challenge device (whose content (value) is to be validated), using the shared ephemeral value is generated. With reference to the embodiments of FIGS. 1 and 2, the signature logic 204 generates this corresponding second digital signature based on the shared ephemeral value. The signature logic 204 generates this second digital signature across a copy of the data of known content (value) that is stored in the storage medium 210. In an embodiment, the signature logic 204 uses the ephemeral value as a cryptographic key to generate the second digital signature (cryptographic hash) of the data of the known content. Any of a number of different types of digital signature/hash operations may be incorporated into embodiments of the invention. For example, such digital signature/hash operations may be based on the BeepBeep encryption operation, different types of Secure Hash Algorithm (SHA) operations (such as SHA-1, SHA-256, SHA-384, SHA-512), different types of Message Digest (MD) operations (such as MD-5), etc. One embodiment of the BeepBeep encryption operation is described in more detail in the following paper: Driscoll, K. (2002) BeepBeep, Embedded Real Time Encryption. Fast Software Encryption Workshop (FSE), Leuven, Belgium, February 4-6, Lecture Notes in Computer Science, Springer-Verlag. The signature logic 204 performs the same type of digital signature/hash operation as performed by the signature logic 302 (in the response device 104) to generate the first digital signature (hash). Control continues at block 512.

In block 512, a determination is made of whether the first digital signature is equal to the second digital signature. With reference to the embodiment of FIG. 2, the authentication logic 212 makes this determination. Control continues at block 514.

In block 514, upon determining that the first digital signature does not equal the second digital signature, the data (which the challenge device 102 is attempting to authenticate) is marked as not authenticated. With reference to the embodiment of FIG. 2, the authentication logic 212 marks this data as not authenticated. For example the authentication logic 212 may make this mark within an authentication log stored in the storage medium 210.

Further, the authentication logic 212 may transmit a message to the response device 104 to not use such data therein. For example, if the data were a patch to an application, the authentication logic 212 may transmit a message to the response device 104 not to incorporate the patch into the application. If the data were cryptographic key(s), the authentication logic 212 may transmit a message to the response device 104 not to use such key(s) for cryptographic operations. If the data were configuration parameters (such as versions of hardware, software, etc.), the authentication logic 212 may transmit a message to the response device 104 to not use the hardware or software identified by such configuration parameters. In one embodiment, such message may cause the response device 104 to become inoperative or have limited operations. Further, the authentication logic 212 may transmit a message to another device (not shown) or to a human agent notifying of the authentication failure. The operations of the flow diagram 500 are then complete.

In block 516, upon determining that the first digital signature does equal the second digital signature, the data (which the challenge device 102 is attempting to authenticate) is marked as authenticated. With reference to the embodiment of FIG. 2, the authentication logic 212 marks this data as authenticated. For example the authentication logic 212 may make this mark within an authentication log stored in the storage medium 210. The operations of the flow diagram 500 are then complete.

Figure 6:
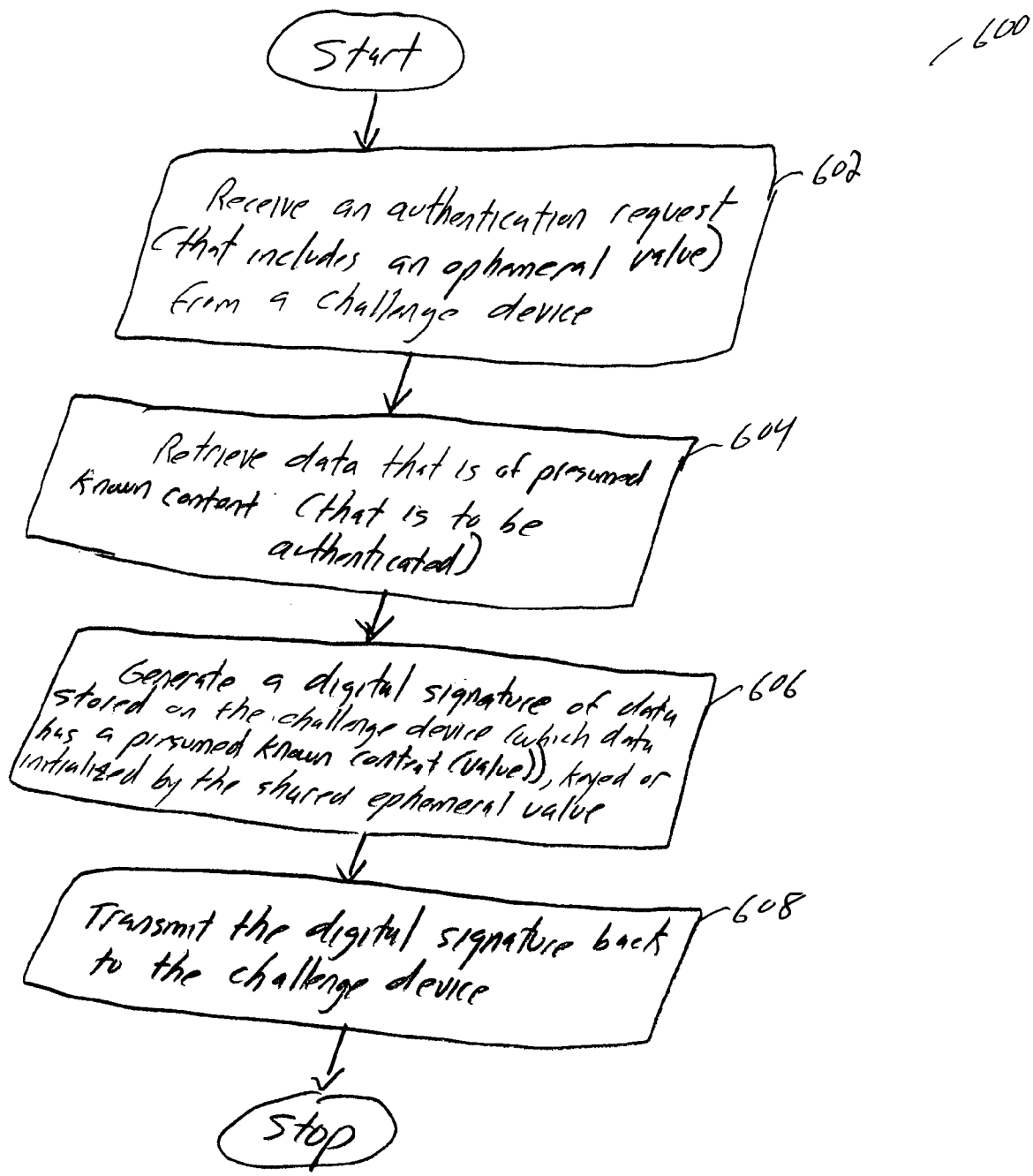
FIG. 6 illustrates a flow diagram for a response to a data authentication request, according to one embodiment of the invention.

FIG. 6 illustrates a flow diagram for a response to a data authentication request, according to one embodiment of the invention. In particular, FIG. 6 illustrates a flow diagram 600 for the operations within a response device, according to one embodiment of the invention.

In block 602, an authentication request (that includes an ephemeral value) is received from a challenge device. With reference to the embodiments of FIGS. 1 and 3, the I/O logic 304 (in the response device 104) receives the authentication request 106 (that includes the ephemeral value 107) from the challenge device 102. Control continues at block 604.

In block 604, data that is of a presumed known content is retrieved. With reference to the embodiment of FIG. 3, the data selection logic 306 retrieves this data from the storage medium 308. In one embodiment, the data is the executable for an application. The data may also be cryptographic keys, configuration parameters or other types of data that are presumed known to both the challenge device 102 and the response device 104. In an embodiment, the data selection logic 306 may perform a decimation operation to select less than all of the data that is to be authenticated. Such a decimation operation may be used if the size of the data is large. For example, this decimation operation may be used if the data to be authenticated is the executable for an application that is 10 megabytes in size. Accordingly, the data selection logic 306 may perform any of a number of decimation operations in the selection of the data. For example, in an embodiment, the data selection logic 306 may select every $N^{th}$ byte in the data to be authenticated, wherein N is derived from the received ephemeral value. In one embodiment, the data selection logic 306 may select the bytes in the address space in which the data is stored based on pseudo-random number generation. Control continues at block 606.

In block 606, a digital signature based on the ephemeral value is generated across the selected data whose content (value) is presumed known. With reference to the embodiment of FIG. 3, the signature logic 302 generates this digital signature. In an embodiment, the signature logic 302 uses the ephemeral value 107 (transmitted as part of the authentication request 106) as a cryptographic key to generate the digital signature (cryptographic hash) of the data of the presumed known content. Any of a number of different types of digital signature/hash operations may be incorporated into embodiments of the invention. For example, such digital signature/hash operations may be based on the BeepBeep encryption operation, different types of SHA operations (such as SHA-1, SHA-256, SHA-384, SHA-512), different types of Message Digest (MD) operations (such as MD-5), etc.

In an embodiment, the signature logic 302 may reduce the size of the digital signature. For example, the signature logic 302 may select every other bit of the digital signature. In one embodiment, the signature logic 302 may reduce the size of the digital signature by combining parts of the hash value, using logical operations (such as XOR). The signature logic 302 may reduce the size of the digital signature by returning its value modulo. Accordingly, the signature logic 204 in the challenge device 102 performs this same algorithmic reduction of the size of the locally computed digital signature prior to the comparison between the received digital signature and the one generated locally within the challenge device 102 (the second digital signature). Control continues at block 608.

In block 608, the digital signature is transmitted back to the challenge device. With reference to the embodiments of FIGS. 1 and 3, the I/O logic 304 transmits the digital signature 108 back to the challenge device 102. Accordingly, the digital signature 108 is representative of both the data of presumed known content and the ephemeral value 107 used to generate the digital signature 108. The operations of the flow diagram 600 are complete.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for data authentication and tamper detection, in accordance with embodiments of the invention. A number of figures show flow diagrams illustrating operations for data authentication and tamper detection. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. To illustrate, while described such that the challenge of the authentication is from a device that is different from the device that is being challenged, embodiments of the invention are not so limited. In an embodiment, a same device may include both the challenge logic and the response logic. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
receiving an ephemeral value from a challenging device;
retrieving data whose content is known to the challenging device;
performing data authentication, wherein performing the data authentication comprises generating a digital signature of the data with a cryptographic key having a value that is equal to the ephemeral value, wherein generating the digital signature of the data based on the ephemeral value comprises generating a one-way hash across the data with the cryptographic key having a value that is equal to the ephemeral value; and
transmitting the digital signature to the challenging device.

2. The method of claim 1, wherein receiving the ephemeral value from the challenging device comprises receiving a randomly generated number from the challenging device.

3. The method of claim 1, wherein retrieving the data comprises retrieving at least part of application code.

4. A method comprising:
receiving, into a response device, an ephemeral value from a challenge device;
retrieving data from an address space in the response device, wherein the data is known to the challenge device and the response device;
performing data authentication of data stored in the challenge device, wherein performing the data authentication comprises generating a hash across the data using the ephemeral value as a key of the hash, wherein the hash of the data based on the ephemeral value comprises generating a one-way hash across the data with the cryptographic key having a value that is equal to the ephemeral value; and
transmitting at least part of the hash to the challenge device.

5. The method of claim 4, further comprising generating a reduced hash based on the hash, wherein transmitting the ephemeral value and the at least part of the hash to the challenge device comprises transmitting the ephemeral value and the reduced hash to the challenge device.

6. The method of claim 4, wherein retrieving the data from the address space in the response device comprises retrieving application code to be executed in the response device.

7. The method of claim 4, wherein retrieving the data from the address space in the response device comprises retrieving configuration parameters of the response device.

8. A method comprising:
authenticating data having predictable content and stored in an address space of a remote device, the authenticating comprising:
generating a random number;
transmitting the random number to a remote device presumably having the data;
receiving, from the remote device, a first digital signature that is representative of the data;
generating a second digital signature with a cryptographic key having a value that is equal to the random number;
comparing the first digital signature to the second digital signature; and
marking the data as authenticated if the first digital signature equals the second digital signature.

9. The method of claim 8, wherein authenticating the data having predictable content comprises authenticating an application executable.

10. The method of claim 8, wherein authenticating the data having predictable content comprises authenticating at least one security parameter.

11. An apparatus comprising:
a storage medium to store data;
an input/output (I/O) logic to receive a request for authentication from a challenge device, wherein the request includes an ephemeral value; and
a signature logic to retrieve at least part of the data from the storage medium and to perform data authentication of the data, wherein the data authentication comprises generation of a cryptographic hash across the at least part of the data with a cryptographic key having a value that is equal to the ephemeral value, wherein the hash of the data based on the ephemeral value comprises generating a one-way hash across the data with the cryptographic key having a value that is equal to the ephemeral value.

12. The apparatus of claim 11, wherein the I/O logic is to receive the request for authentication from a challenge device, the I/O logic to transmit the cryptographic hash back to the challenge device.

13. The apparatus of claim 11, wherein the storage medium is a nonvolatile memory.

14. The apparatus of claim 11, further comprising a data selection logic to select less than all of the data, wherein the at least part of the data is the less than all of the data.

15. The apparatus of claim 14, wherein the data selection logic is to select less than all of the data based on a random number based selection of segments of the data.

16. The apparatus of claim 11, wherein the data comprises an application to be executed in the apparatus.

17. The apparatus of claim 11, wherein the data comprises at least one security parameter of the apparatus.

18. A challenge device to authenticate data presumably stored in a response device, the challenge device comprising:
   a storage medium to store a copy of the data presumed to be stored in the response device;
   a key generation logic to generate an ephemeral value;
   an input/output (I/O) logic to output a request for authentication to a response device, wherein the request includes the ephemeral value, the I/O logic to receive a first digital signature from the response device in response to the request for authentication;
   a signature logic to retrieve the copy of the data and the ephemeral value and to generate a second digital signature; and
   an authentication logic to compare the first digital signature to the second digital signature, wherein the data is marked as authenticated if the first digital signature equals the second digital signature.

19. The challenge device of claim 18, wherein the ephemeral value comprises a randomly generated value.

20. The challenge device of claim 18, wherein the data comprises application code to be executed by the response device.

21. The challenge device of claim 18, wherein the data comprises at least one configuration parameter of the remote device.

22. A computer storage device physical machine-readable medium that provides instructions, which when executed by a machine, cause said machine to perform operations comprising:
   receiving an ephemeral value from a challenging device;
   retrieving data whose content is presumed known to the challenging device;
   performing data authentication, wherein performing the data authentication comprises generating a digital signature of the data with a cryptographic key having a value that is equal to the ephemeral value, wherein generating the digital signature of the data based on the ephemeral value comprises generating a one-way hash across the data with the cryptographic key having a value that is equal to the ephemeral value; and
   transmitting the digital signature to the device.

23. The computer storage device of claim 22, wherein receiving the ephemeral value from the device comprises receiving a randomly generated value from the device.

24. The computer storage device physical machine-readable medium of claim 22, wherein retrieving the data comprises retrieving at least part of application code.

25. A computer storage device that provides instructions, which when executed by a machine, cause said machine to perform operations comprising:
   receiving, into a response device, an ephemeral value from a challenge device;
   retrieving data from an address space in the response device, wherein the data is presumed known to the challenge device;
   performing data authentication of data stored in the challenge device, wherein performing the data authentication comprises generating a hash across the data using the ephemeral value as a key of the hash, wherein the hash of the data based on the ephemeral value comprises generating a one-way hash across the data with the cryptographic key having a value that is equal to the ephemeral value; and
   transmitting at least part of the hash to the challenge device.

26. The computer storage device of claim 25, further comprising generating a reduced hash based on the hash, wherein transmitting the ephemeral value and the at least part of the hash to the challenge device comprises transmitting the ephemeral value and the reduced hash to the challenge device.

27. The computer storage device of claim 25, wherein retrieving the data from the address space in the response device comprises retrieving application code to be executed in the remote device.

28. The computer storage device of claim 25, wherein retrieving the data from the address space in the response device comprises retrieving configuration parameters of the remote device.

29. A computer storage device that provides instructions, which when executed by a machine, cause said machine to perform operations comprising:
   authenticating the data having predictable content and stored in an address space of a remote device, the authenticating comprising:
      generating a random number;
      transmitting the random number to a device presumably having the data;
      receiving a first digital signature that is representative of the data;
      generating a second digital signature with a cryptographic key having a value that is equal to the random number;
      comparing the first digital signature to the second digital signature; and
      marking the data as authenticated if the first digital signature equals the second digital signature.

30. The computer storage device of claim 29, wherein authenticating the data having predictable content comprises authenticating an application executable.

31. The computer storage device of claim 29, wherein authenticating the data having predictable content comprises authenticating at least one security parameter.

* * * * *